United States Patent [19]
Landreneau

[11] Patent Number: 5,862,780
[45] Date of Patent: Jan. 26, 1999

[54] GROOMING TOOL FOR PETS

[76] Inventor: Randall L. Landreneau, 1138 Riverbend Club Dr., Atlanta, Ga. 30339

[21] Appl. No.: 505,107
[22] Filed: Jul. 21, 1995
[51] Int. Cl.[6] .......................... A01K 13/00; A45D 24/42
[52] U.S. Cl. ........................... 119/616; 119/625; 132/119
[58] Field of Search ................................... 119/616, 625, 119/626, 630, 601, 613, 619, 651; 132/119, 139, 141, 142, 152, 219; 15/104.5, 142, 186

[56] References Cited

U.S. PATENT DOCUMENTS

| | | | |
|---|---|---|---|
| 997 | 11/1838 | Sanford | 119/625 |
| D. 266,112 | 9/1982 | Culp | D30/40 |
| 277,594 | 5/1883 | McMahon | 132/219 X |
| D. 332,511 | 1/1993 | Irving | D30/159 |
| 883,752 | 4/1908 | Spicer | 15/142 |
| 1,220,105 | 3/1917 | Hart | 132/119 |
| 1,225,601 | 3/1917 | Hare | 119/626 |
| 1,638,407 | 8/1927 | Overbeck | 119/616 X |
| 1,663,468 | 3/1928 | Vaughn | 132/139 |
| 1,861,040 | 5/1932 | Williams | 132/142 |
| 2,236,446 | 3/1941 | Pucci | 132/141 |
| 2,562,465 | 7/1951 | Kassel | 132/119 |
| 3,205,903 | 9/1965 | D'Avanzo | 132/139 |
| 3,574,885 | 4/1971 | Jones | 119/625 X |
| 3,893,424 | 7/1975 | Casler | 119/616 |
| 4,799,457 | 1/1989 | Gordon | 119/630 |
| 4,970,990 | 11/1990 | Wilhelmi | 119/601 |

FOREIGN PATENT DOCUMENTS 263451 12/1926 United Kingdom ..................... 15/142

Primary Examiner—Michael J. Carone
Assistant Examiner—Elizabeth Shaw
Attorney, Agent, or Firm—Ronald E. Smith

[57] ABSTRACT

An improved tool for grooming pets, especially for the removal of loose hair and hair that is soon to become loose, comprised of a base (10) with comb extensions (12,14) mounted on either side at an angle of less than 90 degrees to the base. The comb extensions (12,14) are comprised of tines extending from a solid backbone or shoulder (16) that protrudes from the base (10). The comb extensions (12) on one side of the base have tines that are larger and spaced further apart than the tines of the comb extensions (14) on the other side of the base. A cleaning tool (18) comprised of a base (20) with tines (22) protruding therefrom is held in a compartment (24) on the side of the invention when not in use. As the invention is stroked through the hair of the animal, the angle of the comb extensions (12,14) causes a deep and prolonged penetration of the coat. When the hair passing between the tines of a comb extension comes into contact with the shoulder (16), the hair is compressed, generating friction or pulling force that not only removes hair that is loose but also hair that is still connected to the skin but about to become loose. Other embodiments include one with comb extensions mounted on removable panels (16) that slide onto a base (10) by way of grooves (28) on either side of the base. This embodiment allows for a wider range of comb extension types available for one base.

4 Claims, 3 Drawing Sheets

GROOMING TOOL FOR PETS

BACKGROUND

1. Field of Invention

This invention relates to a device used for grooming pets, specifically to an improved device for the removal of shedding and loose hair from pets as well as for the grooming of living hair.

2. Description of Prior Art

There are a number of pet grooming devices that have as part of their purpose the removal of shedding and loose hair. For a grooming device to be effective in removing shedding and loose hair it must remove not only the hair that is already loose or disconnected from the skin of the animal, but also hair that is still connected to the skin but soon to become disconnected. It is the hair follicles that are about to become loose that are the primary problem because soon after the animal is brushed or combed, these hair follicles will become loose requiring additional combing or brushing for them to be removed. The effectiveness of the prior art in the removal of loose and shedding hair is limited by two factors: 1) the amount of hair that the operative parts of the device come into contact with during use, and 2) the amount of friction between the device and the hair follicles, or pulling force, created as the device is being used.

The typical brush has some effectiveness in removing loose and shedding hair. The closer the bristles are together, the more friction occurs between the hair follicles and the brush bristles, and the more loose and shedding hair the device will remove. However, the closer the bristles are together, the harder it is to penetrate the coat of hair of the animal. If the coat of hair is not fully penetrated, the bristles of the brush do not come into contact with enough of the hair follicles that need to be removed.

The typical comb has some effectiveness in removing loose and shedding hair. The closer the teeth of the comb are together, the greater will be the friction between the teeth of the comb and the hair follicles, causing increased removal of shedding and loose hair. As with the brush, there is a limit to how close the teeth of a comb can be together and still allow effective penetration of the coat of hair. In addition, a typical comb has only one row of teeth, limiting the amount of contact with hair follicles during its use.

U.S. Pat. No. 3,893,424 to Casler (1975) shows a comb with two rows of teeth angularly directed so that one tooth crosses and contacts another tooth. An animal's hair will pass between these teeth and the pressure between these teeth will pull at the hair and remove it if it is loose. While this invention does have pulling force, it has limited contact with hair follicles due to having two rows of teeth coming together at only one effective contact point.

U.S. Pat. No. 4,799,457 to Gordon (1989) shows an elongated comb strip with V-shaped teeth on one side and parallel teeth on the other with mating handle members at either end of the strip so that the device can be bent into a closed loop teardrop shape for use. This device has the same limitation as the other combs—limited contact with hair follicles due to having one row of teeth and limited pulling force.

U.S. Pat. No. 3,574,885 to Jones (1971) discloses a brush designed to be attached to a vacuum cleaner tube enabling suction of loose hairs and other particles from the coat of a pet. Another device in use is a glove with the underside coated with a surface of soft, sticky rubber containing short conical protrusions. Both of these devices are limited in their effectiveness in removing loose hair by the limited amount of hair follicles that they come into contact with during use and the limited amount of friction between them and the hair follicles.

Objects and Advantages

Accordingly, several objects and advantages of my invention are:

(a) to provide a grooming device for pets that is more effective than the prior art in 1) penetrating the coat of the animal, 2) contacting a significant portion of the hair follicles of the animal, and 3) removing loose and shedding hair and knots as well as grooming the living hair;

(b) to provide a grooming device for pets that generates enough friction between the parts in contact with the hair follicles and the hair follicles, or pulling force, to effectively pull out hair follicles that are about to shed but not yet disconnected from the skin as well as removing hair follicles that are already disconnected from the skin;

(c) to provide a grooming device for pets that effectively removes loose hair and hair that will be shed but is not yet disconnected from the skin that is not unpleasant to the animal being groomed;

(d) to provide a grooming device for pets that effectively removes loose hair and hair that will be shed but is not yet disconnected from the skin that is effective on long as well as short haired animals and thin as well as thick haired animals;

Further objects and advantages of my invention will become apparent from a consideration of the drawings and ensuing description.

DRAWING FIGURES

Reference Numerals In Drawings

| | |
|---|---|
| 10 base | 12 larger tined comb extensions |
| 14 smaller tined comb extensions | 16 shoulder of comb extension |
| 18 cleaning tool | 20 base of cleaning tool |
| 22 tines of cleaning tool | 24 compartment for cleaning tool |
| 26 removable panel containing comb extensions | 28 grooves in base into which removable panels slide |

DESCRIPTION

Figure 1:
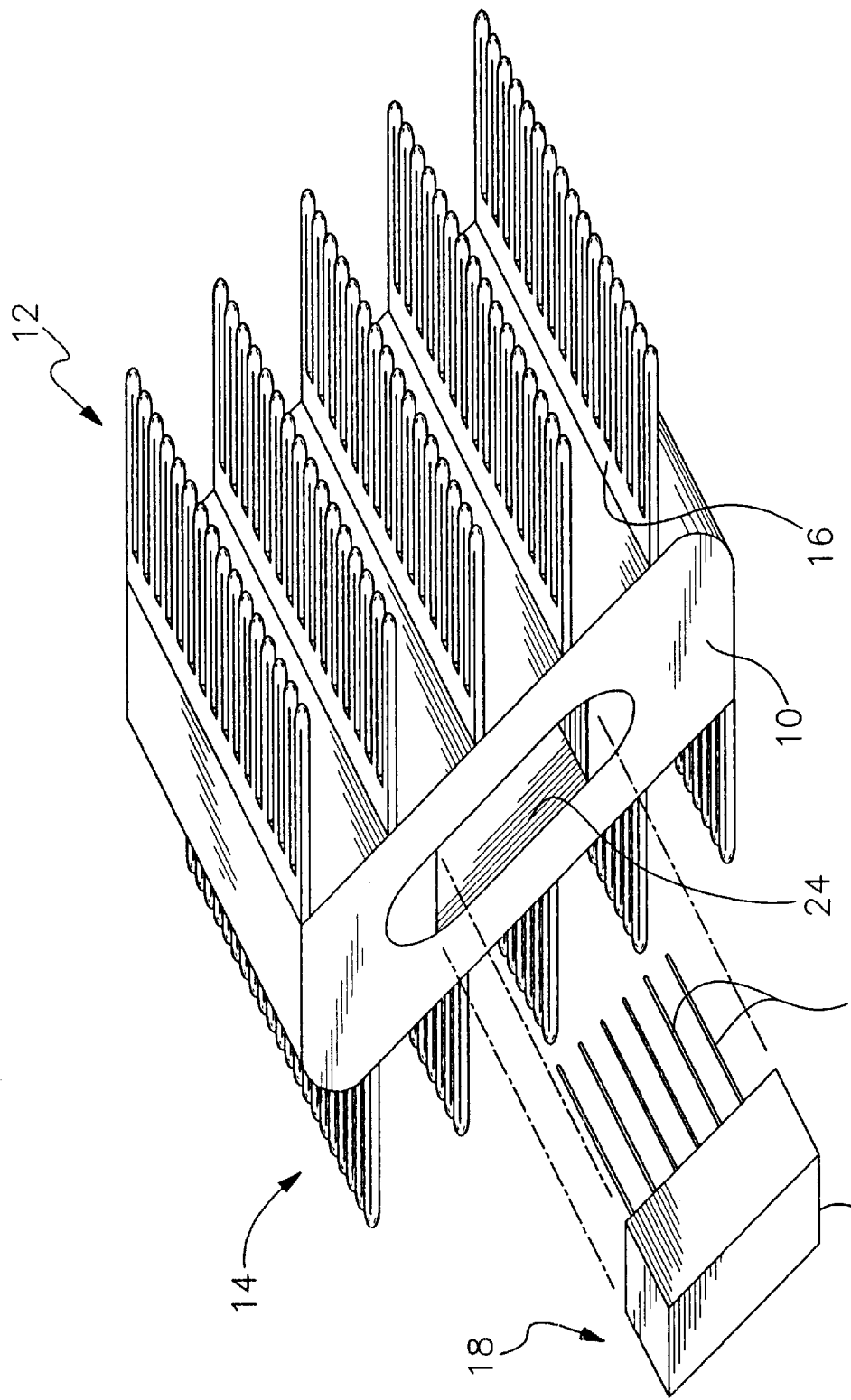
FIG. 1 shows a three dimensional view of a typical embodiment of the invention.
Figure 2:
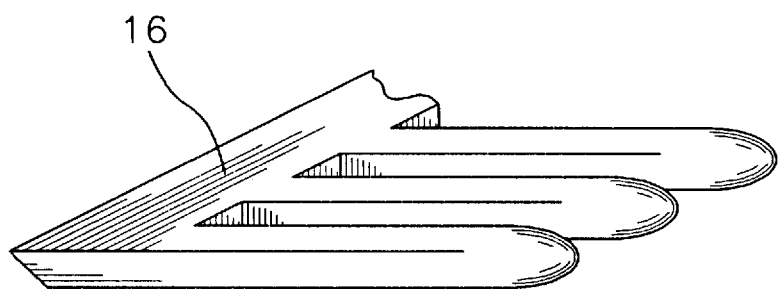
FIG. 2 shows a close-up of a comb extension.
Figure 3:
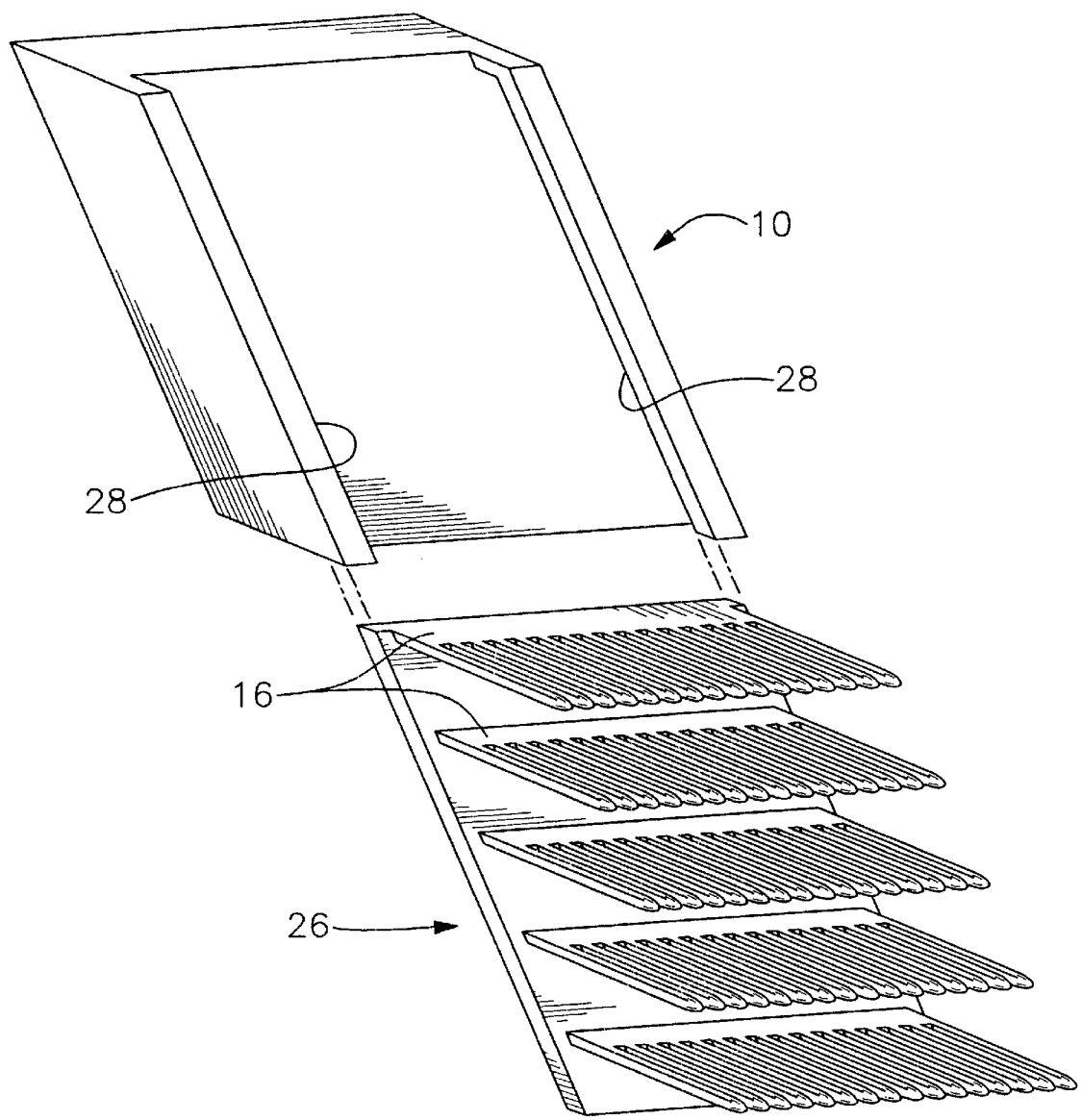
FIG. 3 shows a three dimensional view of an embodiment of the invention with removable panels containing comb extensions.

FIGS. 1 to 3

A typical embodiment of the present invention is illustrated in FIG. 1 (three dimensional view) and FIG. 2 (close-up of comb extension).

Extending from either side of a base 10 are a number of comb extensions 12, 14 set at an angle of less than ninety degrees to the base (while tests have shown 30 degrees to 45 degrees to be the most effective angle for most situations, there are uses that would require less than a 30 degree angle or more than a 45 degree angle). The tines of each comb extension extend from a solid backbone or shoulder 16 (FIGS. 1 and 2) that protrudes from the base at the same angle as the comb extensions. One side of the base has comb extensions that have tines that are larger and spaced further apart 12 than the tines of the comb extensions on the other side of the base 14. A cleaning tool 18, comprised of a base 20 with several tines protruding therefrom 22, is held in a compartment 24 when not in use.

The described embodiment of the base 10 and comb extensions 12,14 would be produced as one solid piece using a plastic or other substance with enough flexibility to prevent breakage but otherwise relatively stiff. The ends of the tines of the comb extensions 12, 14 would be rounded enough to not be sharp. The cleaning tool 18 would have a base 20 of a similar material as the rest of the invention with the tines 22 being made of a metal or other substance allowing a smaller diameter as a means of passing more easily between the tines of the comb extensions 12, 14.

Another embodiment is shown in FIG. 3 (embodiment with removable panels). This embodiment has comb extensions mounted on removable panels 26 that connect to a base 10 by way of grooves 28 on either side. The removable panels of comb extensions provide a means of having one base with a number of different panels with different comb extension types available.

Operation

The grooming device is stroked through the fur of an animal by holding the invention so that a surface of the base 10 with the comb extensions 12,14 is parallel to the surface being groomed. As the grooming device is stroked through the fur, the less than ninety degree angle of the comb extensions 12,14 to the base 10 causes the tines of the comb extensions to penetrate and dig deeply into the fur coat throughout the stroke. The deep penetration caused by the angle of the comb extensions forces a tremendous volume of hair follicles to pass between the tines of the comb extensions 12, 14. When the high volume of hair follicles passing between the tines of the comb extensions 12, 14 is compressed against the protruding shoulder 16, a significant friction or pulling force is created. This pulling force enables the invention to remove not only disconnected hair and debris but also hair follicles that are still connected but about to become loose.

The purpose of having comb extensions with larger, further apart tines 12 on one side of the invention and comb extensions with smaller, closer together tines 14 on the other side is to allow the optimum use of the device for different situations. The side of the device with the smaller, closer together tines will create more pulling force than the side with the larger, further apart tines. An animal with hair that is dense, long, or knotted may require the larger tined side, whereas an animal with sparse, short, or fine hair may require the smaller tined side.

To clean the extracted hair from the invention, the user grasps the cleaning tool 18 by the base 20 and strokes the tines 22 between the tines of the comb extensions 12, 14 from the shoulder 16 out.

The embodiment with removable panels (FIG. 3) allows for greater variability in comb extension type. Rather than just having two different types of comb extensions (large and small) on one product, a user might have a number of panels, each with comb extensions of different sized and spaced tines. Such an embodiment would allow the user to adjust the invention for use in a wide range of applications.

Summary, Ramifications, and Scope

Accordingly, the reader will see that the Grooming Device invention described above contacts a very significant amount of hair and generates an effective pulling force for the removal of loose hair and hair that is soon to become loose. It is also adjustable for varying situations and types of hair and easy to clean.

Although the description above contains many specificities, these should not be construed as limitations on the scope of the invention. For example, one possible embodiment would have the surfaces containing the comb extensions concave as a means of conforming more closely to the curved surfaces of smaller animals. Another possible embodiment would have tines that get larger in circumference as they go from tip to base or shoulder. This would cause a compression of the hair passing through the tines and increase the pulling force. Also, for very large animals, an embodiment of this invention too large for one's hand to reach around would necessitate some type of handle or structure for gripping the invention not shown here.

I claim:

1. A grooming tool for pets comprising a base having opposite sides and a plurality of rows of tines mounted at acute angles to at least one of said base sides, and a second plurality of rows of tines mounted at acute angles to said other base side.

2. A grooming tool for pets comprising a base having a substantially flat side and means for pulling out hair follicles about to be disconnected from the skin and shed, said pulling means comprising a backbone mounted transversely to said base flat side at an acute angle of inclination from which backbone a row of tines extend, wherein said base has a second substantially flat side opposite said substantially flat side, and wherein said pulling means comprises a second backbone mounted transversely to said second base flat side at an acute angle from which a second row of tines extends.

3. The grooming tool of claim 2 wherein said row of tines is in a first plane and said second row of tines is in a second plane oriented parallel to said first plane.

4. A grooming tool for pets comprising a base having a substantially flat side straddled by opposed grooves, a flat panel sized to be removably mounted flushly upon said base flat side with side portions slidably positioned within said grooves, a backbone mounted transversely to said panel, and a row of tines projected from said backbone at an acute angle with respect to said flat panel.

* * * * *